United States Patent
Shinmura et al.

(10) Patent No.: US 6,574,559 B2
(45) Date of Patent: *Jun. 3, 2003

(54) COLLISION AVOIDING SYSTEM FOR VEHICLES

(75) Inventors: Tomoyuki Shinmura, Wako (JP); Kenji Kodaka, Wako (JP); Yoichi Sugimoto, Wako (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,781

(22) Filed: Jul. 8, 1998

(65) Prior Publication Data

US 2001/0003810 A1 Jun. 14, 2001

(30) Foreign Application Priority Data

Jul. 9, 1997 (JP) ............................... 9-183612

(51) Int. Cl.$^7$ ............................ B62D 6/00; G08G 1/16; G06F 165/00
(52) U.S. Cl. ....................... 701/301; 701/300; 340/903; 180/275
(58) Field of Search ................................ 701/301, 300, 701/96, 41, 80; 340/903; 342/71; 180/275, 282

(56) References Cited

U.S. PATENT DOCUMENTS

| | | | | | |
|---|---|---|---|---|---|
| 3,898,652 A | * | 8/1975 | Rashid | ........................ | 343/6 R |
| 4,998,593 A | * | 3/1991 | Karnopp et al. | ............. | 180/140 |
| 5,314,037 A | * | 5/1994 | Shaw et al. | .................. | 180/169 |
| 5,418,727 A | * | 5/1995 | Ikeda et al. | ............. | 364/426.04 |
| 5,461,357 A | * | 10/1995 | Yoshioka et al. | ............ | 340/435 |
| 5,485,892 A | * | 1/1996 | Fujita | .......................... | 180/167 |
| 5,530,651 A | * | 6/1996 | Uemura et al. | .............. | 364/461 |
| 5,640,324 A | * | 6/1997 | Inagaki | ................... | 364/426.01 |
| 5,667,033 A | * | 9/1997 | Shimizu et al. | .............. | 180/272 |
| 5,699,040 A | * | 12/1997 | Matsuda | ..................... | 340/435 |
| 5,854,987 A | * | 12/1998 | Sekine et al. | .................. | 701/41 |
| 5,925,083 A | * | 7/1999 | Ackermann | ................... | 701/41 |

* cited by examiner

Primary Examiner—Tan Q. Nguyen
Assistant Examiner—Dalena Tran
(74) Attorney, Agent, or Firm—Arent Fox Kintner Plotkin & Kahn, PLLC (57) ABSTRACT

A collision avoiding system is provided to enhance a collision avoiding effect by stabilizing a vehicle behavior during automatic braking. Steering controlling apparatus includes not only an ordinary electric power steering control unit but also an active steering reaction calculating unit for driving a motor of a steering system to compensate for the influence of disturbances, if the vehicle is shocked by an unusual bounce from an uneven road or the like. When obstacle detecting apparatus such as a laser-radar detects an obstacle which requires operation of automatic braking, a control parameter changing unit receives the automatic braking activating signal to make a change in the control parameters for an active steering reaction control. As a result, the steering control apparatus controls steering to suppress the influence of the disturbances more substantially during automatic control of the vehicle than otherwise, so that the turbulence of the vehicle can be prevented to retain a sufficient braking force, thereby enhancing the collision avoiding effect.

3 Claims, 8 Drawing Sheets

COLLISION AVOIDING SYSTEM FOR VEHICLES

BACKGROUND OF THE INVENTION

1. Field of the Invention

The present invention relates to a vehicular collision avoiding system for avoiding a collision with an obstacle located ahead of a vehicle, by braking the vehicle on the basis of the relative distance and the relative speed between the obstacle and the vehicle.

2. Description of the Prior Art

In the prior art, there is known a collision avoiding system for avoiding a collision with an obstacle, by detecting a forward obstacle with a radar carried on the vehicle, and by braking the vehicle automatically on the basis of the relative distance and the relative speed between the vehicle and the obstacle.

There is also known a steering assisting system for stabilizing the behavior of the vehicle against disturbances such as cross winds, by detecting the vehicular behavior from the yaw rate and the lateral acceleration of the vehicle, and by applying to the steering system, when the vehicle is disturbed by the cross winds or the like, a steering torque in a direction to suppress the change in the vehicular behavior through an actuator.

Here, when the collision avoiding system of the prior art performs substantial automatic braking on an uneven road having a high coefficient of friction, it may be difficult to change the running of the vehicle. As a result, a lateral force may be established in the tires to weaken the longitudinal force, thereby failing to establish a sufficient deceleration, or the radar may lose the obstacle, thereby failing to achieve a sufficient collision avoiding effect.

SUMMARY OF THE INVENTION

The present invention has been conceived in view of the background described above and has the object to enhance the collision avoiding effect, by stabilizing the vehicular behavior during automatic braking by the collision avoiding system.

In order to achieve the above-specified object, according to the present invention, there is provided a collision avoiding system for a vehicle, comprising: an obstacle detecting means for detecting an obstacle located ahead of the vehicle; a braking system for braking the vehicle; and brake control means for controlling the operation of the braking system on the basis of a relative distance and a relative speed between the vehicle and the obstacle, as detected by the obstacle detecting means. A steering system steers the vehicle, and steering controlling means outputs a steering command signal to control the operation of the steering system on the basis of a braking command signal outputted by the brake control means.

The influence of the disturbances from an uneven road or the like can be compensated for to effect collision avoiding control, by controlling the steering system according to the operation of the braking system, even if the vehicle is disturbed by an uneven road when the braking system is activated to avoid the collision with an obstacle.

In addition according to the present invention, the steering controlling means controls the operation of the steering system in a direction to suppress the influence of the disturbances and will influence the steering of the vehicle when the disturbances are generated. The collision avoiding control can thus be effected by controlling the steering system in the direction to suppress the influence of the disturbances.

Further according to the present invention, when the brake control means outputs the braking command signal, the steering controlling means corrects the steering command signal in a manner to substantially suppress the influence of the disturbances. Thus, the influence of the disturbances, which are liable to occur during braking, can be effectively suppressed because the influence of the disturbances is suppressed more substantially during braking of the vehicle than otherwise.

In addition according to the present invention, the steering controlling means corrects the steering command signal in accordance with the degree of the influence which is exerted upon the steering of the vehicle by the operation of the braking system. The operation of the steering system can thus be optimized by correcting the steering command signal to match the degree of the influence to be exerted upon the steering of the vehicle by the operation of the braking system.

Further according to the present invention, the degree of the influence exerted upon the steering of the vehicle by the operation of the steering system, is calculated on the basis of at least one of the road surface friction coefficient, the longitudinal acceleration of the vehicle, the braking force of the vehicle and the tie rod axial tension. It is thus possible to properly calculate the degree of the influence to be exerted upon the steering of the vehicle by the operation of the braking system.

DETAILED DESCRIPTION OF THE PREFERRED EMBODIMENT

Figure 1:
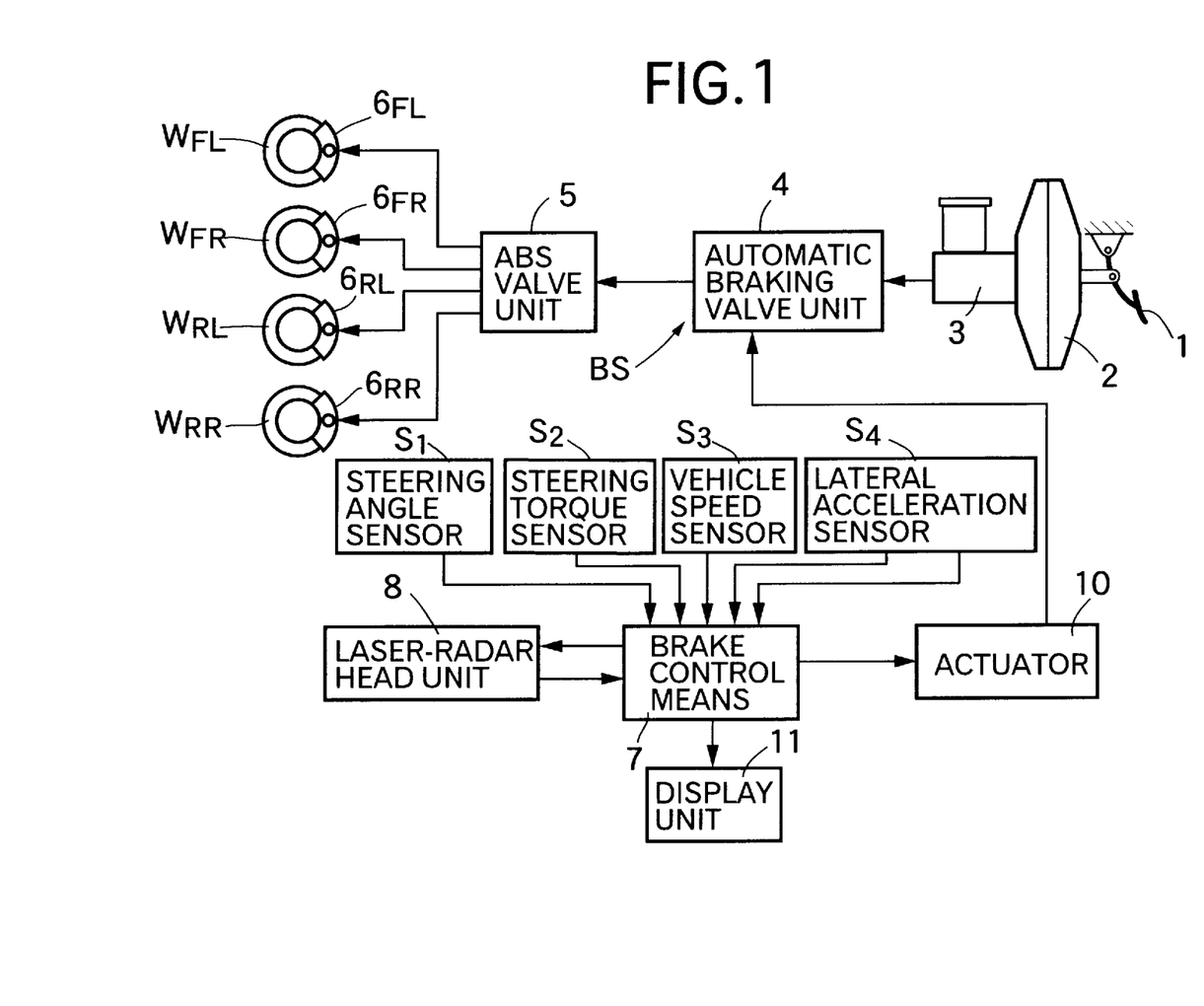
FIG. 1 is a diagram of a vehicle equipped with a collision avoiding system of the present invention.

A vehicular braking system BS, as shown in FIG. 1, brakes the front wheels $W_{FL}$ and $W_{FR}$ and the rear wheels $W_{RL}$ and $W_{RR}$ by transmitting brake fluid pressure, as generated by a master cylinder 3 activated by operating a brake pedal 1 through a vacuum booster 2, to brake cylinders $6_{FL}$ and $6_{FR}$, and $6_{RL}$ and $6_{RR}$ of the front and the rear wheels $W_{FL}$ and $W_{FR}$, and $W_{RL}$ and $W_{RR}$ through an automatic braking valve unit 4 and an ABS (Anti-lock Brake System) valve unit 5. A brake control means 7 comprising a microcomputer, receives inputted signals from a laser-radar head unit 8 acting as obstacle detecting means for detecting an obstacle ahead of a vehicle, a steering angle sensor $S_1$ for detecting the steering angle of the steering wheel 9, a steering torque sensor $S_2$ for detecting the steering torque of the steering wheel 9, a vehicle speed sensor $S_3$ for detecting the vehicle speed on the basis of the numbers of rotation of the front and the rear wheels $W_{FL}$ and $W_{FR}$, and $W_{RL}$ and $W_{RR}$, and a lateral acceleration sensor $S_4$ for detecting the lateral acceleration of the vehicle. On the basis of these signals, the brake control means 7 activates the automatic braking valve unit 4 through an actuator 10 and informs the driver with a warning of the automatic braking and the data on the vehicle state through a display unit 11.

Figure 2:
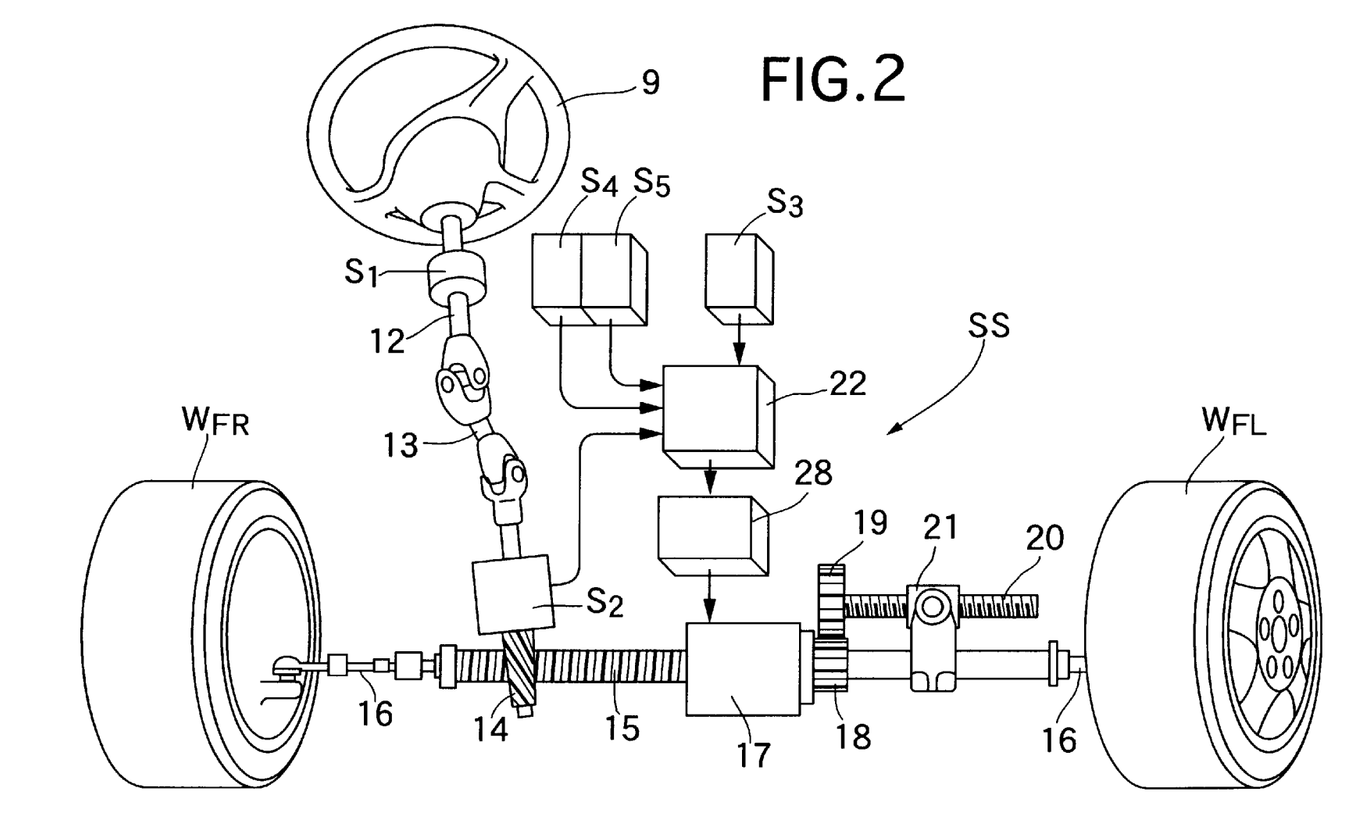
FIG. 2 is a diagram showing the structure of a steering system.

A vehicular steering system SS, as shown in FIG. 2, steers the left and the right front wheels $W_{FL}$ and $W_{FR}$, by transmitting the turns of the steering wheel 9 to a rack 15 through a steering shaft 12, a connecting shaft 13 and a pinion 14, and by transmitting the reciprocations of the rack 15 to the left and the right front wheels $W_{FL}$ and $W_{FR}$ through left and right tie rods 16 and 16. The steering system SS has an electric power steering function and includes a drive gear 18 mounted on the output shaft of a motor 17, a driven gear 19 meshing with the drive gear 18, a screw shaft 20 integral with the driven gear 19, and a nut 21 meshing with the screw shaft 20 and connected to the rack 15.

By feedback-controlling the motor 17 so that the steering torque detected by the steering torque sensor $S_2$ has a predetermined value according to the vehicle speed detected by the vehicle speed sensor $S_3$, therefore, the driving force of the motor 17 can be transmitted to the left and the right front wheels $W_{FL}$ and $W_{FR}$ through the drive gear 18, the driven gear 19, the screw shaft 20, the nut 21, the rack 15 and the left and the right tie rods 16 and 16, thereby assisting the steering of the left and the right front wheels $W_{FL}$ and $W_{FR}$ by the steering operation of the driver.

Figure 3:
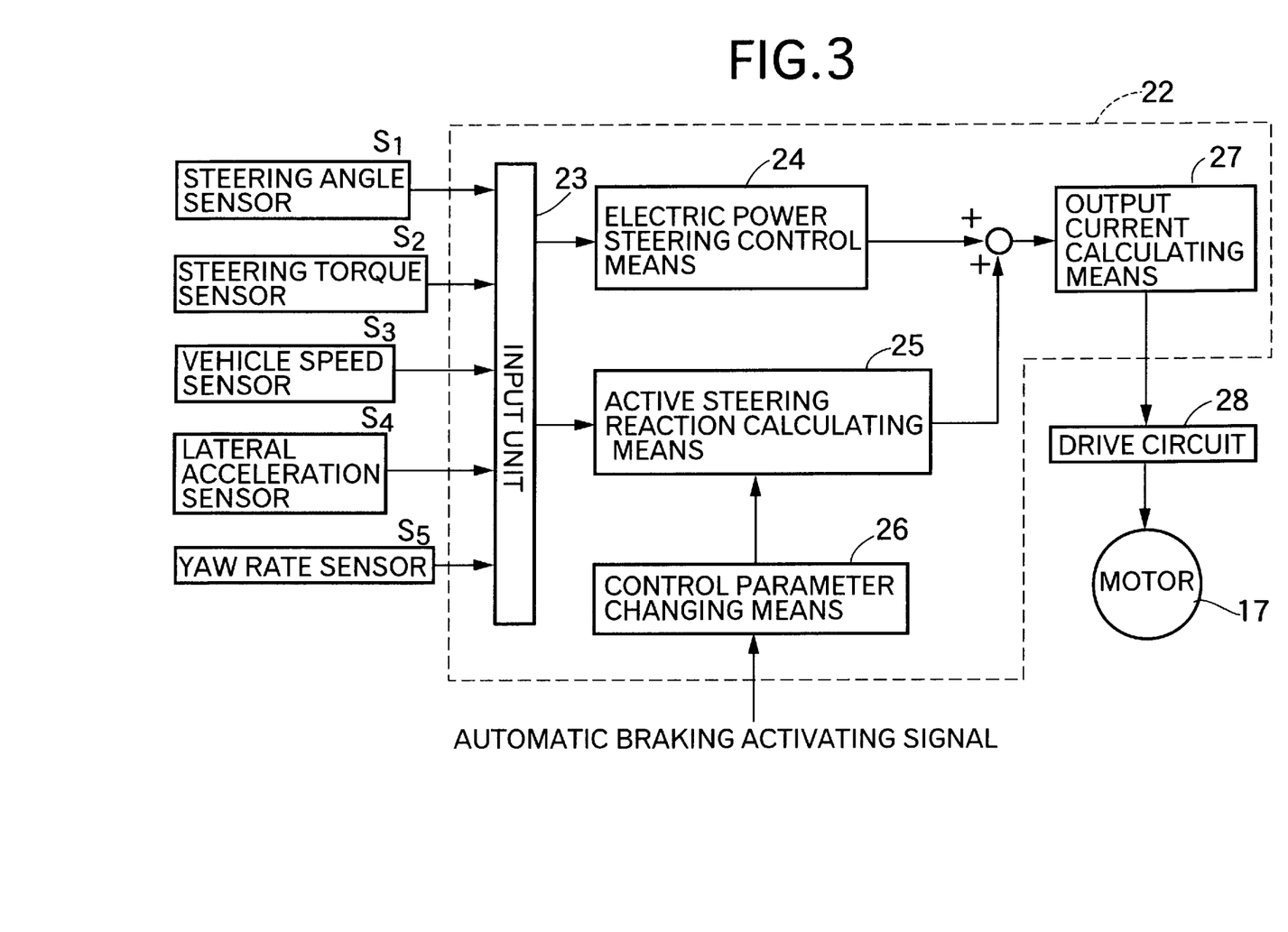
FIG. 3 is a block diagram of a steering controlling device.

It is apparent with additional reference to FIG. 3 that the steering system SS has an active steering reaction controlling function in addition to the electric power steering function. The active steering reaction control is one for automatically establishing the steering torque in a direction to eliminate yawing of the vehicle, if caused by disturbances such as cross winds.

Specifically, steering controlling means 22 which comprises a microcomputer includes: an input unit 23 for receiving a signal from a yaw rate sensor $S_5$ for detecting the yaw rate of the vehicle, in addition to the signals from the steering angle sensor $S_1$, the steering torque sensor $S_2$, the vehicle speed sensor $S_3$ and the lateral acceleration sensor $S_4$; electric power steering control means 24 for controlling the electric power steering function in response to a signal from the input unit 23; an active steering reaction calculating means 25 for controlling the active steering reaction control function in response to a signal from the input unit 23; a control parameter changing means 26 for changing the control parameters for the active steering reaction control on the basis of the automatic braking activating signal outputted by the brake control means 7; and output current calculating means 27 for calculating an output current for driving the motor 17, on the basis of the result of the addition of the output of the electric power steering control means 24 and the output of the active steering reaction calculating means 25. Thus, both the electric power steering function and the active steering reaction control function can be exhibited by feeding the electric current, as calculated by the output current calculating means 27, to the motor 17 through a drive circuit 28.

Here will be described the contents of an integral control in which the automatic braking control and the active steering reaction control are related to each other.

First of all, the contents of the automatic braking control by the brake control means 7 will be described. When the laser-radar head unit 8 detects an obstacle such as another vehicle running ahead the vehicle, as shown in FIG. 1, the brake control means 7 calculates the relative speed and the relative distance between the vehicle and the obstacle. When the relative speed and the relative distance come into the automatic braking active region as hatched in the map of FIG. 4, the brake control means 7 outputs a braking command signal to the actuator 10 to activate the automatic braking valve unit 4. As a result, the vehicle is automatically braked to avoid a collision with the obstacle by feeding the brake fluid of pressure from the oil pressure source in the automatic braking valve unit 4 to the brake cylinders $6_{FL}$, $6_{FR}$, $6_{RL}$ and $6_{RR}$, even if the driver does not depress the brake pedal 1.

Figure 4:
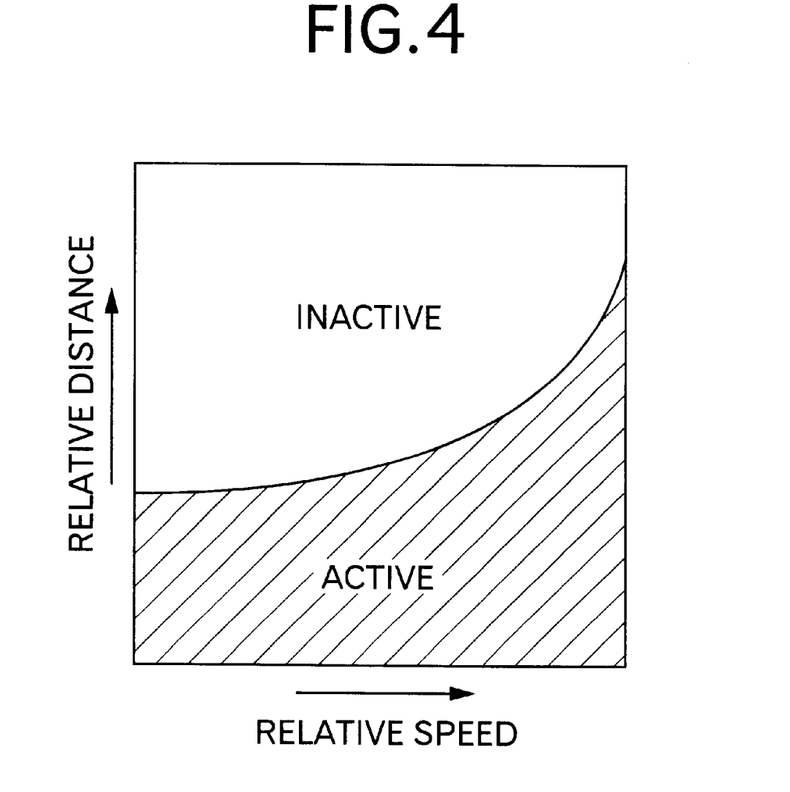
FIG. 4 is a map for searching the operation conditions for automatic braking.

When it is decided on the basis of the map of FIG. 4 whether or not the automatic braking is to be activated, a more proper automatic braking can be performed by changing the map according to the magnitude of a road surface friction coefficient which is detected on the basis of the outputs of the steering angle sensor $S_1$, the steering torque sensor $S_2$, the vehicle speed sensor $S_3$ and the lateral acceleration sensor $S_4$. Here, if the wheels have a tendency to be locked no matter whether the vehicle is in ordinary braking by the brake pedal 1 or in the automatic braking the ABS valve unit 5 controls to reduce the brake fluid pressure to suppress the locking of the wheels.

Figure 5:
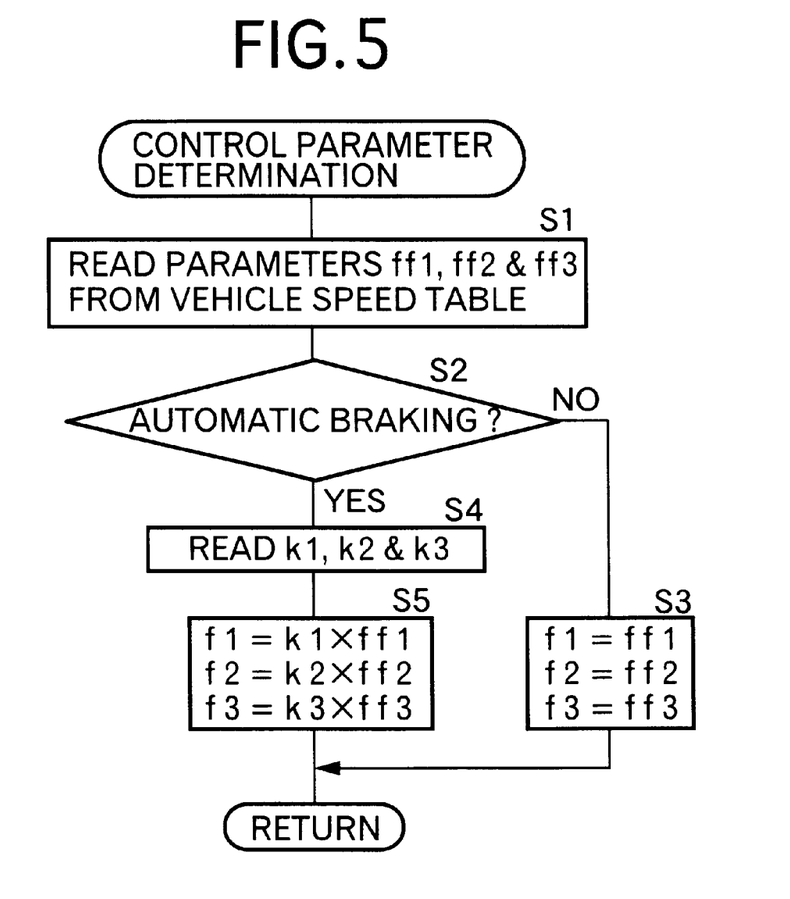
FIG. 5 is a flow chart of a control parameter determining routine.

A control parameter determining routine in the active steering reaction control will be described with reference to the flow chart of FIG. 5.

Figure 7A:
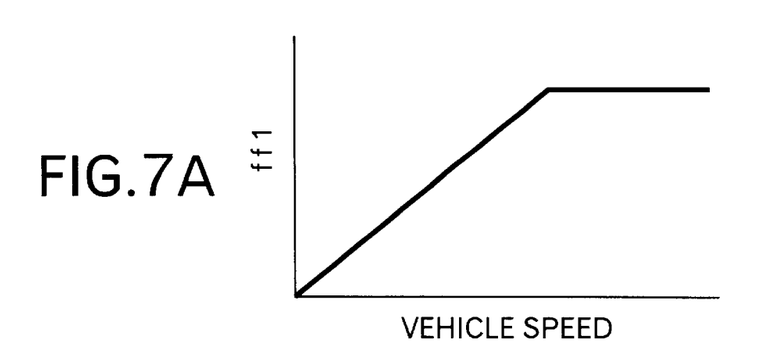
FIGS. 7A to 7C are diagrams illustrating tables for searching control parameters.
Figure 7B:
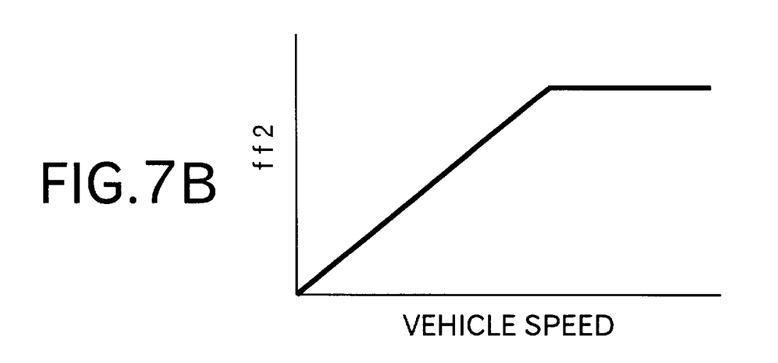
Figure 7C:
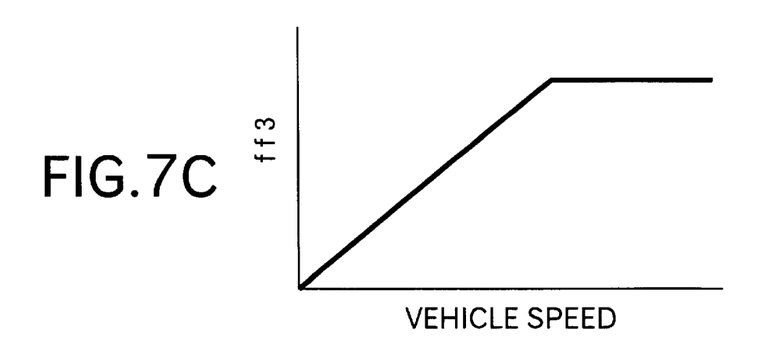

At first Step S1, the steering controlling means 22 searches three control parameters ff1, ff2 and ff3 from the tables of FIG. 7 on the basis of the vehicle speed detected by the vehicle speed sensor $S_3$. The control parameter ff1 is provided for calculating the steering reaction based on a steering rate $d\theta/dt$; the control parameter ff2 is provided for calculating the steering reaction based on a yaw rate deviation $(\gamma-\gamma_0)$; and the control parameter ff3 is provided for calculating the steering reaction based on the yaw rate $\gamma$. The steering rate $d\theta/dt$ can be achieved by differentiating the steering angle $\theta$ detected by the steering angle sensor $S_1$, with time. On the other hand, the yaw rate deviation $(\gamma-\gamma_0)$ is a deviation between the yaw rate $\gamma$ detected by the yaw rate sensor $S_5$ and a reference yaw rate $\gamma_0$, which can be calculated on the basis of transmission function characteristics of the vehicle, as measured in advance. Here, the reason why the individual control parameters ff1, ff2 and ff3 increase with the increase in the vehicle speed is to perform a weighting by the vehicle speed so as to compensate the more likely occurrence of turbulence in the vehicle caused by the disturbances at higher vehicle speed.

During the inactive time of the automatic braking, that is, if it is decided at Step 32 that the brake control means 7 does not output the braking command signal, the control parameter changing means 26 (as shown in FIG. 3) sets, at Step S3, the three control parameters ff1, ff2 and ff3, as searched at Step S1, to final control parameters f1, f2 and f3 without any change.

During the active time of the automatic braking, that is, if it is decided at Step S2 that the brake control means 7 outputs the braking command signal, control parameter correcting coefficients $k_1$, $k_2$ and $k_3$ are searched at Step S4 from the tables of FIG. 8. Any of these control parameter correcting coefficients $k_1$, $k_2$ and $k_3$ has a value larger than 1 and is set to increase from 1, as illustrated in FIG. 8A, as the road surface friction coefficient increases. This setting will be explained by the following. Since the braking force by the automatic braking increases for a higher road surface friction coefficient so that the resultant drag to make it difficult to handle the vehicle (i.e., the aligning torque=the braking force x the king pin offset) accordingly increases, the turbulence in the vehicle caused by the disturbances is substantially suppressed by correcting the control parameters ff1, ff2 and ff3 with the control parameter correcting coefficients $k_1$, $k_2$ and $k_3$ larger than 1. Here, the road surface friction coefficient can be calculated on the basis of the lateral acceleration detected by the lateral acceleration sensor $S_4$, the vehicle speed detected by the vehicle speed sensors $S_3$, the steering angle detected by the steering angle sensor $S_1$ and the steering torque detected by the steering torque sensor $S_2$.

Figure 8A:
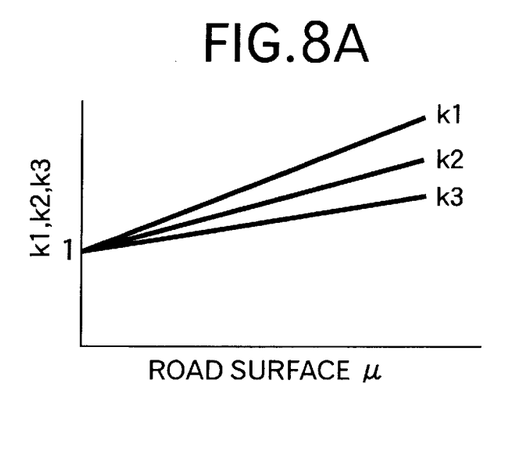
FIGS. 8A to 8D are diagrams illustrating tables for searching control parameter correcting coefficients.
Figure 8B:
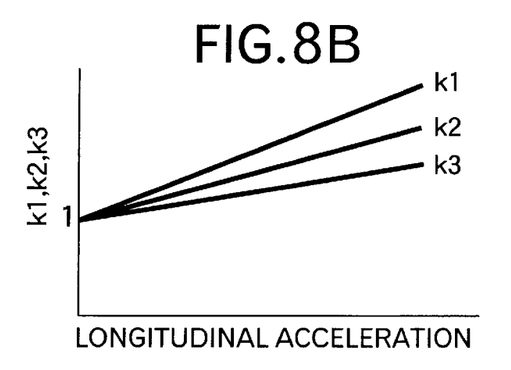
Figure 8C:
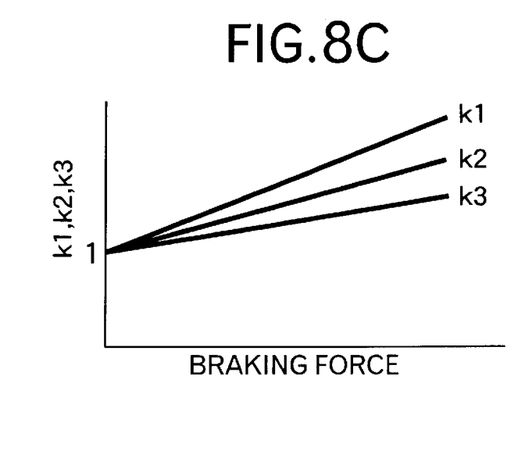
Figure 8D:
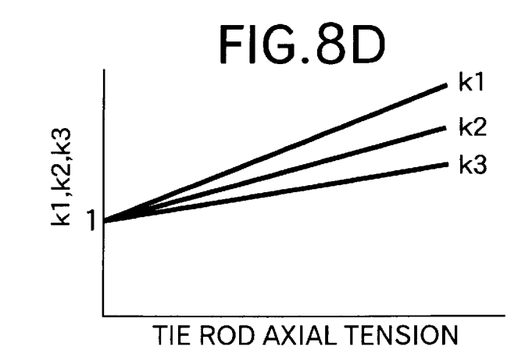

Here, the control parameter correcting coefficients $k_1$, $k_2$ and $k_3$ can be searched not only on the basis of the road surface friction coefficient but also according to the longitudinal acceleration of the vehicle, as illustrated in FIG. 8B, according to the braking force, as illustrated in FIG. 8C, or according to the tie rod axial tension, as illustrated in FIG. 8D.

At Step S5, the control parameter changing means 26 calculates the final control parameters f1, f2 and f3 by multiplying the three control parameters ff1, ff2 and ff3, as retrieved at Step S1, respectively, by the three control parameter correcting coefficients $k_1$, $k_2$ and $k_3$ searched at Step S4.

Figure 6:
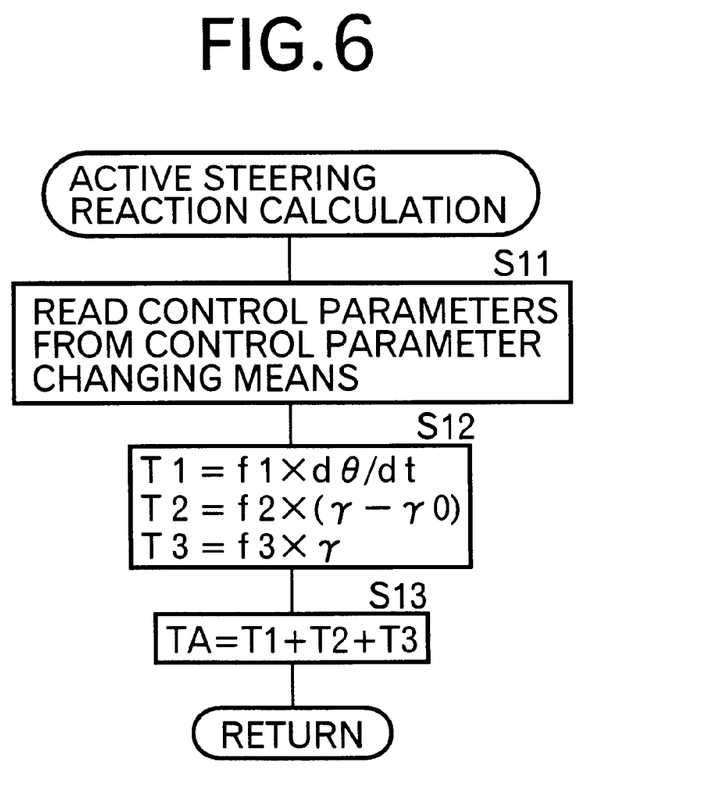
FIG. 6 is a flow chart of an active steering reaction calculating routine.

An active steering reaction calculating routine in the active steering reaction control will be described with reference to the flow chart of FIG. 6.

At first Step S11, the final control parameters f1, f2 and f3, as calculated at Step S3 or S5, are read from the control parameter changing means 26. At subsequent Step S12, the active steering reaction calculating means 25 calculates a first steering reaction T1 as a product of the control parameter f1 and the steering rate $d\theta/dt$, a second steering reaction T2 as a product of the control parameter f2 and the yaw rate deviation $(\gamma-\gamma_0)$, and a third steering reaction T3 as a product of the control parameter f3 and the yaw rate $\gamma$. At Step S13, a target steering reaction TA is calculated by adding the first to third steering reactions T1, T2 and T3. Thus, by outputting the target steering reaction TA to the output current calculating means 27, as shown in FIG. 3, the motor 17 of the steering system SS is activated to generate a steering torque in a direction to suppress the turbulence in the vehicle caused by the disturbances.

If the automatic braking for preventing a collision is executed on an uneven road having a high friction coefficient, as has been described hereinbefore, it may be very difficult to change the running of the vehicle. As a result, a lateral force may be established to lower the longitudinal force thereby failing to have a sufficient deceleration, or the radar may miss an obstacle thereby failing to provide a sufficient collision avoiding effect. According to the invention, however, at the time of executing the automatic braking, the steering controlling means 22 performs the active steering reaction controls to suppress the turbulence of the vehicle so that the braking force can be effectively generated to achieve the sufficient collision avoiding effect.

Although the invention has been described by way of the embodiment above, it can be modified into various designs without departing from its gist.

In the above embodiment, for example, the control parameters ff1, ff2 and ff3 are corrected with the control parameter correcting coefficients $k_1$, $k_2$ and $k_3$ at the time of executing the automatic braking. Despite of this correction, however, similar effects can be achieved even when the different control parameters f1, f2 and f3 are adopted during execution and non-execution times of the automatic braking.

According to the present invention, the influences of the disturbances from an uneven road or the like can be compensated for to effect collision avoiding control by controlling the steering system according to the operation of the braking system, even if the vehicle is disturbed by an uneven road when the braking system is activated to avoid a collision with an obstacle. Further, the collision avoiding control can be effected by controlling the steering system in the direction to suppress the influences of the disturbances.

Still further, the influence of the disturbances, which are liable to occur during braking, can be effectively suppressed because the influence of the disturbances is suppressed more substantially during braking of the vehicle than otherwise.

In addition, the operation of the steering system can be optimized by correcting the steering command signal to match the degree of the influence to be exerted upon the steering of the vehicle by the operation of the braking system.

Further, it is possible to properly calculate the degree of the influence to be exerted upon the steering of the vehicle by the operation of the braking system.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A vehicular collision avoiding system, comprising:

obstacle detecting means for detecting an obstacle located ahead of the vehicle;

a braking system for braking the vehicle;

brake control means for controlling the operation of the braking system on the basis of a relative distance and a relative speed between the obstacle detected by the obstacle detecting means and the vehicle; and a steering system for steering the vehicle comprising steering controlling means coupled to the brake control means, said steering control means outputting a steering command signal to control the operation of the steering system on the basis of a braking command signal outputted by the brake control means, so as to suppress the influence of disturbances caused by the operation of the braking system.

2. A vehicular collision avoiding system as set forth in claim 1, wherein the steering controlling means corrects the steering command signal in accordance with the degree of influence which is exerted upon the steering of the vehicle by the operation of the braking system.

3. A vehicular collision avoiding system as set forth in claim 2, including means for determining a road surface friction coefficient, means for determining a longitudinal acceleration of the vehicle, means for determining a braking force of the vehicle, means for determining a tie rod axial tension and calculating means for calculating the degree of the influence exerted upon the steering of the vehicle by the operation of the steering system on the basis of at least one of the road surface friction coefficient, the longitudinal acceleration of the vehicle, the braking force of the vehicle and the tie rod axial tension.

* * * * *